US010965176B2

(12) United States Patent
Wasson et al.

(10) Patent No.: US 10,965,176 B2
(45) Date of Patent: Mar. 30, 2021

(54) ELECTRIC MOTORS WITH POLE BIASING

(71) Applicant: McMillan Electric Company, Woodville, WI (US)

(72) Inventors: Dewain Wasson, Hudson, WI (US); Karmen Cox, St. Peters, MO (US)

(73) Assignee: McMillan Electric Company, Woodville, WI (US)

( * ) Notice: Subject to any disclaimer, the term of this patent is extended or adjusted under 35 U.S.C. 154(b) by 78 days.

(21) Appl. No.: 16/248,111

(22) Filed: Jan. 15, 2019

(65) Prior Publication Data

US 2020/0227958 A1 Jul. 16, 2020

(51) Int. Cl.
| | |
|---|---|
| *H02K 1/24* | (2006.01) |
| *H02K 29/03* | (2006.01) |
| *H02K 1/14* | (2006.01) |
| *H02K 15/03* | (2006.01) |
| *H02P 6/08* | (2016.01) |
| *H02P 6/26* | (2016.01) |
| *H02K 29/08* | (2006.01) |

(52) U.S. Cl.
CPC ............. *H02K 1/24* (2013.01); *H02K 1/146* (2013.01); *H02K 15/03* (2013.01); *H02K 29/03* (2013.01); *H02K 29/08* (2013.01); *H02P 6/085* (2013.01); *H02P 6/26* (2016.02); *H02K 2201/06* (2013.01)

(58) Field of Classification Search
CPC ............ H02K 1/16; H02K 1/165; H02K 1/24; H02K 1/246; H02K 15/03; H02K 29/03; H02K 29/08; H02K 2201/06; H02P 6/085; H02P 6/26
USPC ............ 310/40 R, 156.47, 216.012, 216.106
See application file for complete search history.

(56) References Cited

U.S. PATENT DOCUMENTS

| | | | | |
|---|---|---|---|---|
| 3,826,960 | A | * 7/1974 | Broadway | ................ H02K 3/28 318/776 |
| 3,973,154 | A | * 8/1976 | Broadway | .............. H02K 17/06 310/184 |
| 4,131,814 | A | * 12/1978 | Donahoo | ............... H02K 17/10 310/172 |
| 4,929,871 | A | 5/1990 | Gerfast | |
| 5,041,749 | A | * 8/1991 | Gaser | ..................... H02K 21/16 310/156.22 |
| 5,598,071 | A | 1/1997 | Dunfield et al. | |
| 5,757,100 | A | 5/1998 | Burgbacher | |
| 6,181,035 | B1 | 1/2001 | Acquaviva | |

(Continued)

FOREIGN PATENT DOCUMENTS

| | | |
|---|---|---|
| CN | 102195435 A | 9/2011 |
| WO | 0237643 A2 | 5/2002 |

OTHER PUBLICATIONS

Hsiao, Chun-Yu et al., "A Novel Cogging Torque Simulation Method for Permanent-Magnet Synchronous Machines," Energies 2011 © 2011, 14 pages.

*Primary Examiner* — Tulsidas C Patel
*Assistant Examiner* — Rashad H Johnson
(74) *Attorney, Agent, or Firm* — Merchant & Gould P.C.

(57) ABSTRACT

An example motor includes: a rotor with a plurality of alternate polarity permanent magnets; and a stator forming a like number of poles. The stator forms one or more biasing features concentrating magnetic flux at at least one location. In some examples, the stator has an interior surface unbroken by locating features, and the stator has one or more openings that form the one or more biasing features.

19 Claims, 11 Drawing Sheets

(56) References Cited

U.S. PATENT DOCUMENTS

| | | | |
|---|---|---|---|
| 6,384,503 B1* | 5/2002 | Iwaki | H02K 1/2786 |
| | | | 310/156.21 |
| 6,512,318 B2 | 1/2003 | Trk et al. | |
| 6,541,882 B2 | 4/2003 | Matsuzawa | |
| 6,727,629 B1 | 4/2004 | Soghomonian et al. | |
| 6,850,019 B2 | 2/2005 | Gerfast | |
| 7,595,575 B2 | 9/2009 | Kaneko et al. | |
| 8,664,826 B2 | 3/2014 | Krotsch | |
| 8,970,080 B2 | 3/2015 | Li et al. | |
| 9,169,117 B1* | 10/2015 | Liang | B81C 1/00285 |
| 2002/0003382 A1* | 1/2002 | Nakano | H02K 29/03 |
| | | | 310/156.47 |
| 2005/0017590 A1* | 1/2005 | Ionel | H02K 1/2733 |
| | | | 310/156.47 |
| 2014/0028148 A1 | 1/2014 | Shelton et al. | |
| 2014/0084741 A1* | 3/2014 | Iwasaki | H02K 1/16 |
| | | | 310/216.091 |
| 2015/0123510 A1* | 5/2015 | Dajaku | H02K 1/14 |
| | | | 310/216.106 |
| 2016/0294266 A1 | 10/2016 | Li et al. | |

* cited by examiner

ELECTRIC MOTORS WITH POLE BIASING

BACKGROUND

Permanent magnet brushless electric motors are desirable for efficiency. Brushless motors are typically more efficient and quieter than induction motors because brushless motor designs avoid rotor losses related to the "induction" process. However, such motors can exhibit increased noise and vibration at slower speeds.

Although different brushless motors can vary in configuration, brushless motors typically run on direct current and include circuitry to sequentially switch (or commutate) the direct current into one or more stator coils. In addition, most brushless motors include a plurality of permanent magnet poles attached to a rotor.

SUMMARY

In one aspect, an example single phase, permanent magnet electric motor can include: a rotor with a plurality of alternate polarity permanent magnets; and a stator forming a like number of poles. The stator can have an interior surface unbroken by locating features, and the stator can form one or more magnetic flux biasing features. Other configuration and embodiments are possible.

DETAILED DESCRIPTION

The present disclosure is directed to electric motors, including single phase, permanent magnet electric motors.

In certain examples, the electric motors include a rotor with alternate-polarity magnets rotatably journaled in the motor and a stator with a like number of stator poles. The motor includes two or more magnets and a like number of stator poles. More preferably, the motor includes six magnets and six stator poles. However, other motor configurations are possible.

Figure 1:
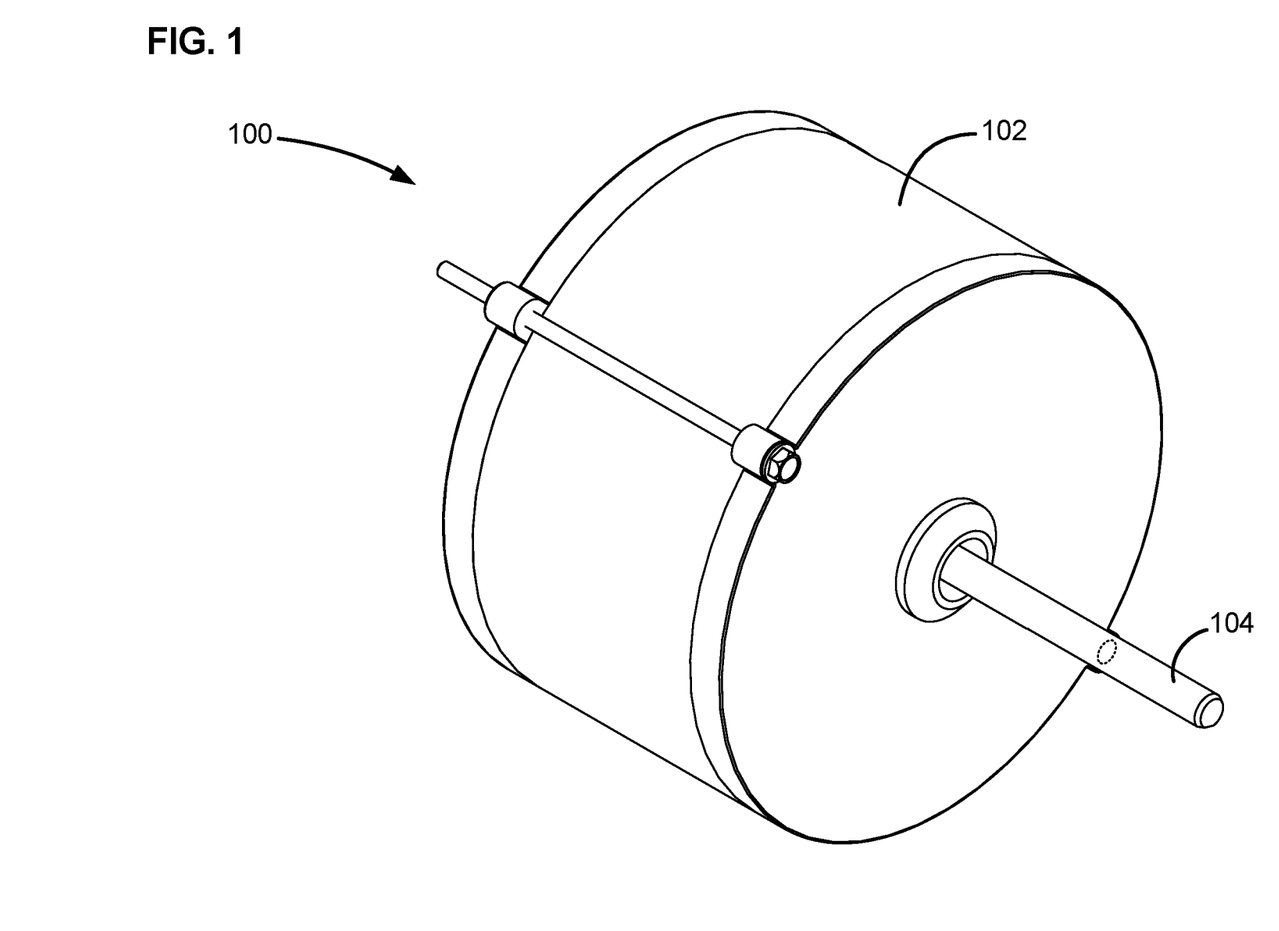
FIG. 1 shows an example single phase, direct current permanent magnet brushless electric motor.

Referring now to FIG. 1, an example single phase, permanent magnet electric motor 100 is shown. The electric motor 100 includes a housing 102 and a shaft 104. The housing 102 covers the internal components of the electric motor 100. The electric motor 100 drives the shaft 104 to power devices in various applications, such as one or more fans in heating, ventilation, and air conditioning (HVAC) systems. Other applications are possible.

Figure 2:
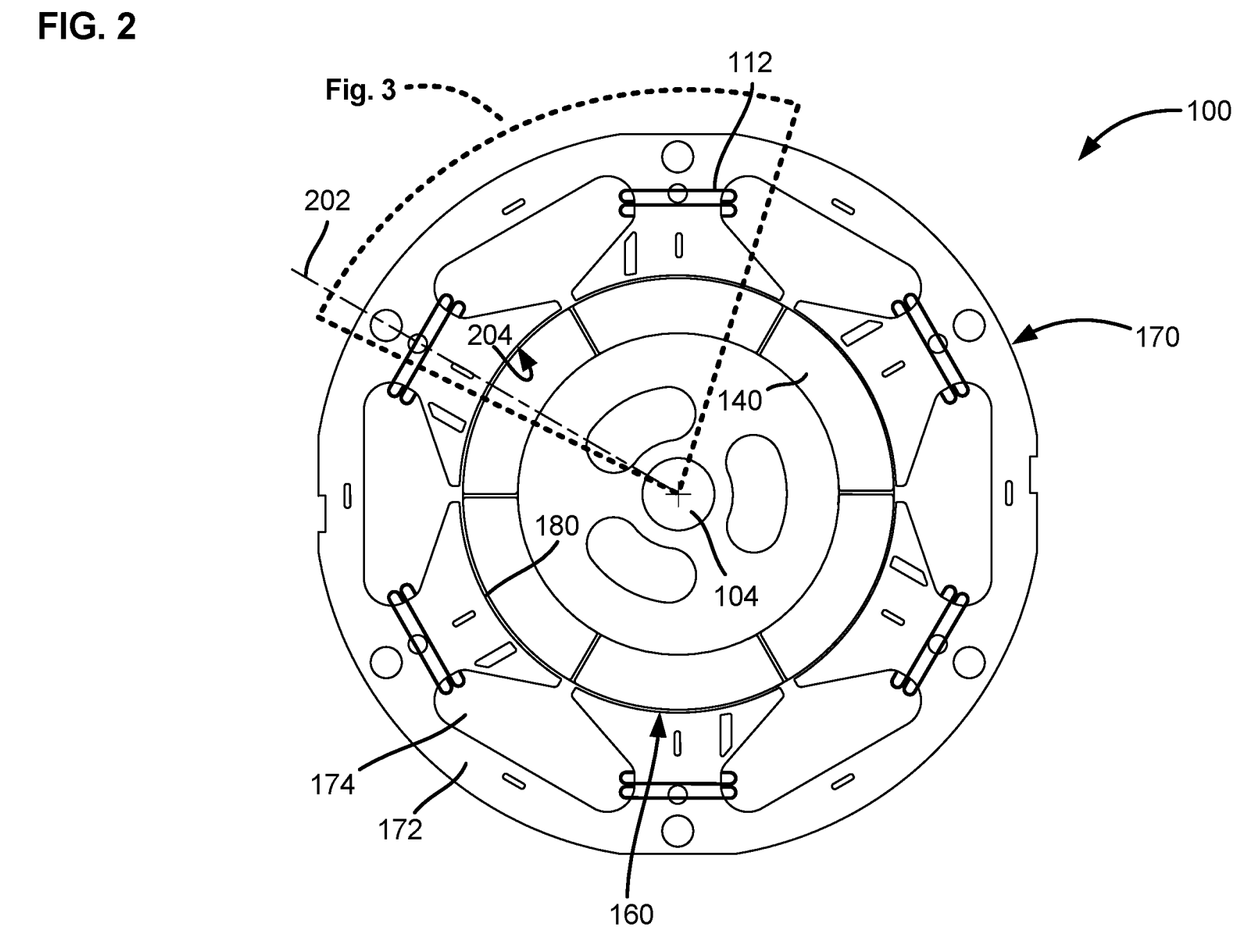
FIG. 2 shows a schematic view of a portion of the electric motor of FIG. 1.
Figure 3:
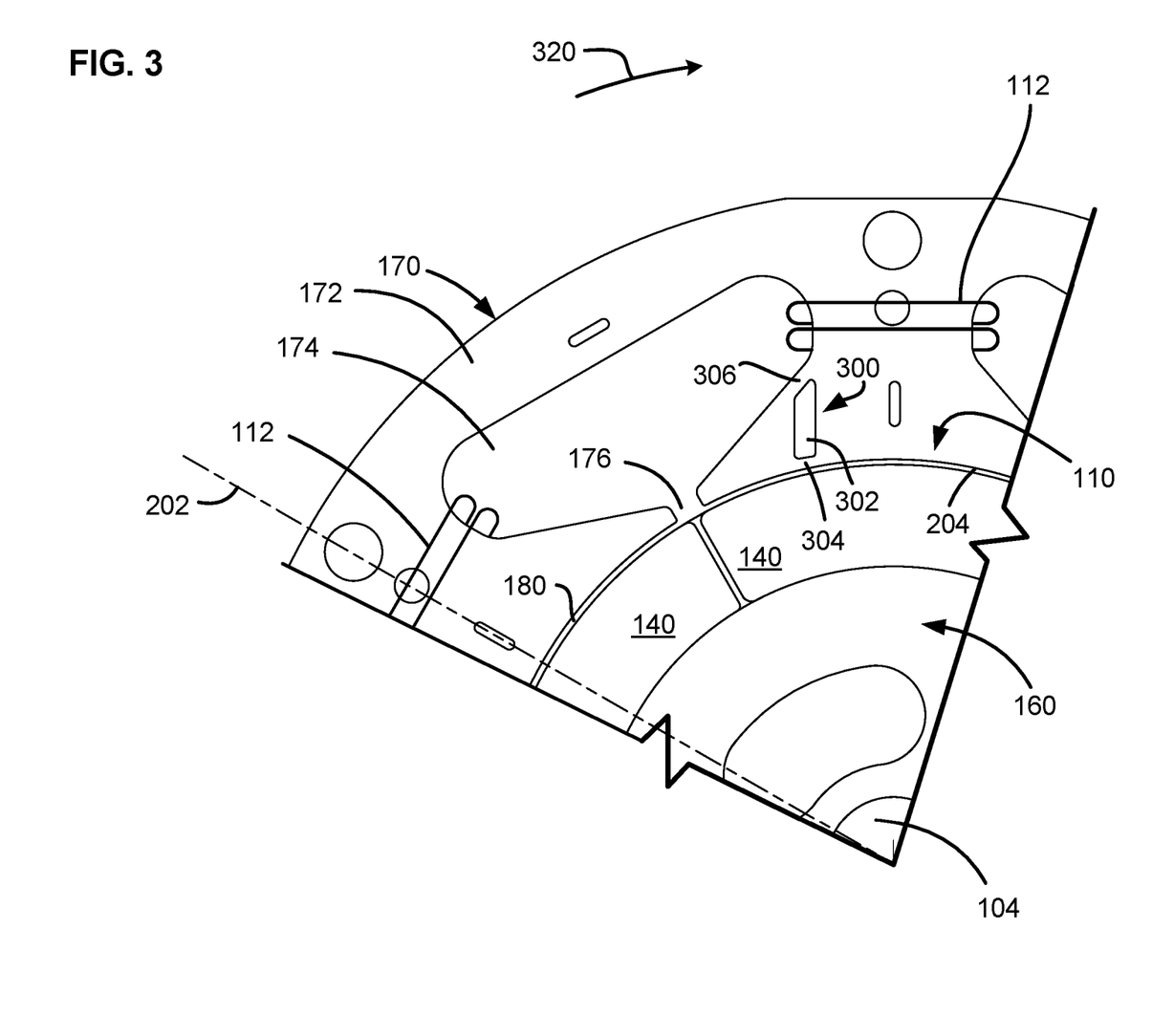
FIG. 3 shows an enlarged view of a portion of the electric motor of FIG. 2.

Referring now to FIGS. 2-3, a schematic view of the electric motor 100 is shown. In this embodiment, the motor 100 includes a stationary stator 170 and a rotatable rotor 160. In this example, an airgap 180, formed between the stator 170 and the rotor 160, is concentrically uniform (except for openings 176 used to wind). In other words, in this embodiment, there are no locating features (e.g., "reluctance notches" or nonconcentric airgaps) formed in the inner diameter 204 of the stator 170.

The stator 170 is formed of a plurality of laminations 172 stacked together and includes a plurality of poles 110 (sometimes each referred to as a "tooth") around which wire 112 (sometimes referred to as a winding) is individually wound and connected to form a single coil or wire. Specifically, each stator pole 110 is formed by winding the wire 112 between winding openings or slots 174 of the stator 170 in a given direction. Each alternating pole 110 is wound in an opposite direction and connected to the next pole to form an alternating series of north and south stator poles in the radial direction.

In addition, the rotor 160 of the electric motor 100 includes a plurality of rotor poles 140, formed by permanent magnets coupled to the rotor 160. Each alternating rotor pole 140 is of a different polarity to form an alternating series of north and south rotor poles also in the radial direction. The illustrated rotor 160 is an internal rotor, although external or other rotor types can also be used.

Preferably, at least two alternating stator poles and two associated rotor poles are provided. Preferably, the electric motor includes the same number of stator and rotor poles. Most preferably, and as illustrated, the electric motor 100 includes six stator poles 110 and a like number of rotor poles 140.

To operate the electric motor 100, electrical current is applied through the wire 112 forming the six stator poles 110. As the current flows, the stator poles 110 act as electromagnets of alternating north or south polarity, depending on which direction each stator pole 110 is wound and the direction of the current flowing therethrough.

The rotor poles 140 are attracted to each respective adjacent oppositely-energized stator pole 110, causing the rotor 160 to turn. As the current flowing through the wire 112 is alternately switched or commutated between the forward and a reverse direction, each stator pole 110 changes polarity to attract an oppositely-charged rotor pole 140, causing the rotor 160 to continue spinning. One commutation cycle (i.e., the change in the direction of the current from forward to reverse or vice versa) is required for each pole to cause the rotor to complete a full revolution of 360 degrees. For the illustrated six-pole motor, six commutation cycles (or pulses) are required to cause the rotor 160 to complete one full 360-degree revolution. As the rotor 160 spins, torque is transferred to a shaft 104 that is coupled to the rotor 160 of the motor 100.

A sensor (such as a Hall sensor, not shown) that can be fixed on the stator, in close proximity to the permanent magnets on the rotor, is able to determine the polarity of the magnet positioned in front of it. The sensor is thereby used to provide feedback as to the angular position of the rotor 160 relative to the stator 170 to control the direction and timing of the current (forward or reverse), thereby providing the switching necessary to cause the rotor 160 to spin, sometimes referred to as commutation.

Multiple speeds for the motor 100 can be accomplished, for example, with pulse circuits including pulse width modulation (PWM), phase control, or multiple windings, or by switching in a current limiting capacitor in an alternating current line, if the motor is driven by rectified alternating current as described in U.S. Pat. No. 4,929,871 to Gerfast.

Referring still to FIGS. 2-3, the rotor 160 of the electric motor 100 may naturally come to rest with each magnet aligned along an axis 202 with each pole of the stator 170. In such a configuration, it can be difficult to restart the electric motor 100 because current flowing through the poles of the stator 170 provide little or no rotational torque on the rotor 160 given the alignment along the axis 202.

In some implementations, laminations for the stators of single phase motors are designed to locate the rotor and keep it from aligning with the axis 202 of the stator poles when the motor is powered off and comes to a stop. One such feature to accomplish this location is one or more locating features. These locating features are formed along an interior surface 204 of the stator 170. The locating features function to move the axis of each stator pole 110 slightly, so that the rotor 140 does not align along the axis 202 at rest. An example of a motor including locating features is provided in U.S. Pat. No. 6,850,019 to Gerfast.

In traditional designs, locating features necessarily break up the interior surface 204 of the stator 170 and/or cause a discontinuous airgap between the stator 170 and the rotor 160. One possible undesired consequence of locating features is an increase in cogging torque and vibration of the electric motor 100, particularly at lower rotational speeds.

In embodiments described herein, one or more biasing features are used that can accomplish one or both of: (i) bias, unbalance, or otherwise shift the location of the magnetic pole(s) (i.e., by shifting the axis 202 of FIG. 3) to allow for increased available torque; and (ii) reduce cogging and vibration, particularly at lower rotational speeds.

Figure 4:
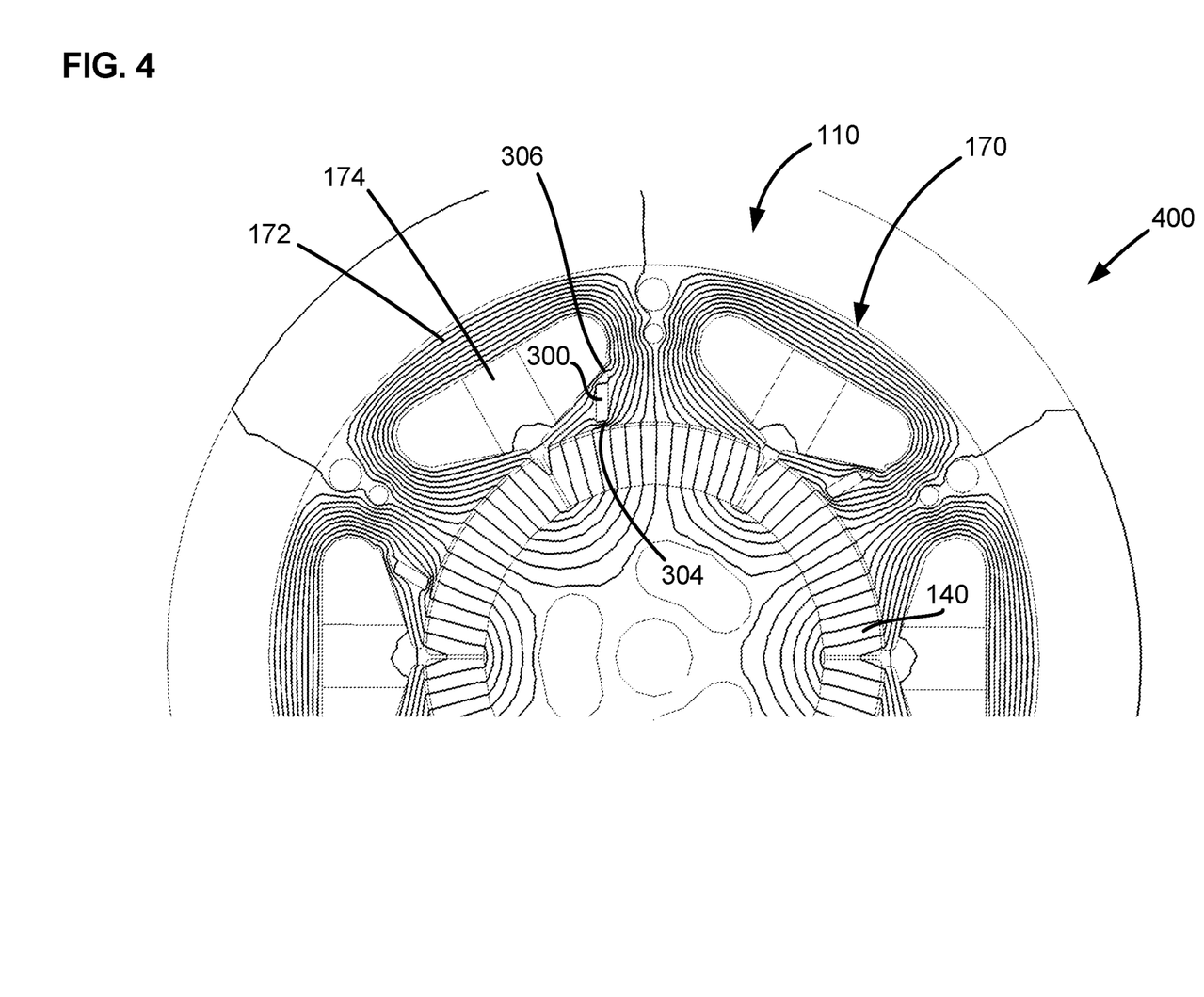
FIG. 4 shows a simulated finite element plot of a portion of the electric motor of FIG. 2.

For example, referring to FIGS. 2-4, a biasing feature 300 is formed in the stator 170. This biasing feature 300 is formed at each pole 110, although other configurations are possible. The biasing feature 300 can be formed by punching or otherwise creating an opening 302 in each lamination 172. In general terms, the biasing feature 300 concentrates magnetic flux at given locations, thereby shifting the magnetic axis 202 of the stator 170 to impact the available torque of the rotor 160 upon starting.

In this embodiment, the biasing feature 300 is positioned adjacent to each of the winding slots 174 of the stator 170. At least a first portion 304 of the lamination 172 is maintained between the biasing feature 300 and the interior surface 204 of the stator 170. This allows the interior surface 204 to be concentric with the rotor surface and unbroken by any locating features. In other words, the interior surface 204 of the stator 170 lacks any locating features formed therein.

In the illustrated embodiment, at least a second portion 306 of the lamination 172 is maintained between the biasing feature 300 and each of the winding slots 174 of the stator 170. This can help to maintain the structural integrity of the laminations 172 forming the stator 170. Although the opening 302 is shown generally as a quadrangle shape, other shapes can also be used. The shape of the opening 302 of the biasing feature 300 can be modified as desired to concentrate the magnetic flux generated by the current flowing through the windings 112 to shift magnetic alignment of poles 110 (e.g., clockwise in a direction 320, in this instance) to offset from the axis 202.

Specifically, referring now to FIG. 4, a simulated finite element plot 400 of a portion of the electric motor 100 is shown. In this example, the biasing feature 300 causes the magnetic flux induced into the stator pole by the current flowing through the windings 112 to saturate at the first and second portions 304, 306. This shifts the alignment of the magnetic poles 110 slightly clockwise in the direction 320 to offset from the axis 202 when current begins to flow into the windings. This increases the available torque to the electric motor 100 to move the rotor 160 from rest in this position.

In addition, as noted, since the biasing feature 300 is located within the lamination 172, the interior surface 204 remains smooth and unbroken by any locating features. In other words, the interior surface 204 of the stator 170 lacks any locating features formed therein. This reduces the cogging torque and vibration associated with low rotational speeds of the rotor 160 caused by locating features or non-uniform airgaps formed by the interior surface 204.

Figure 5:
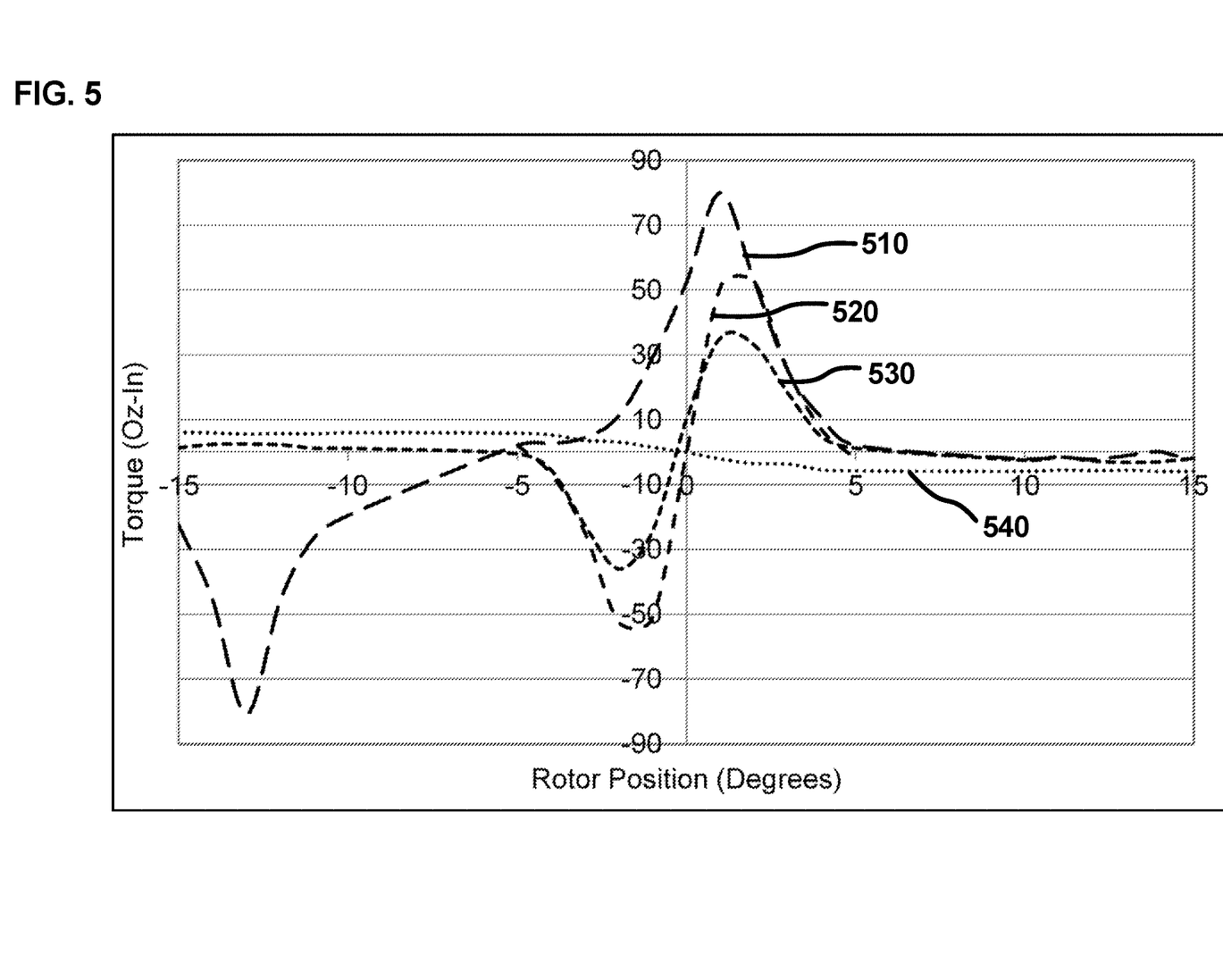
FIG. 5 shows example simulated cogging torque plots for various single phase, direct current permanent magnet brushless electric motors.

For example, FIG. 5 illustrates simulated cogging torques for various motor designs. A torque plot 510 illustrates cogging torque for an electric motor with locating features formed on the interior surface 204 of the stator 170, such as that shown in U.S. Pat. No. 6,850,019 to Gerfast. Such an electric motor exhibits peak cogging torque of approximately 80 ounce-inches.

A torque plot 520 illustrates cogging torque for an electric motor with a uniform airgap but no biasing feature as described herein. This design exhibits peaking cogging torque of approximately 55 ounce-inches.

A torque plot 530 illustrates cogging torque for an electric motor with a biasing feature as described herein. This design exhibits peaking cogging torque of approximately 36 ounce-inches.

Figure 7:
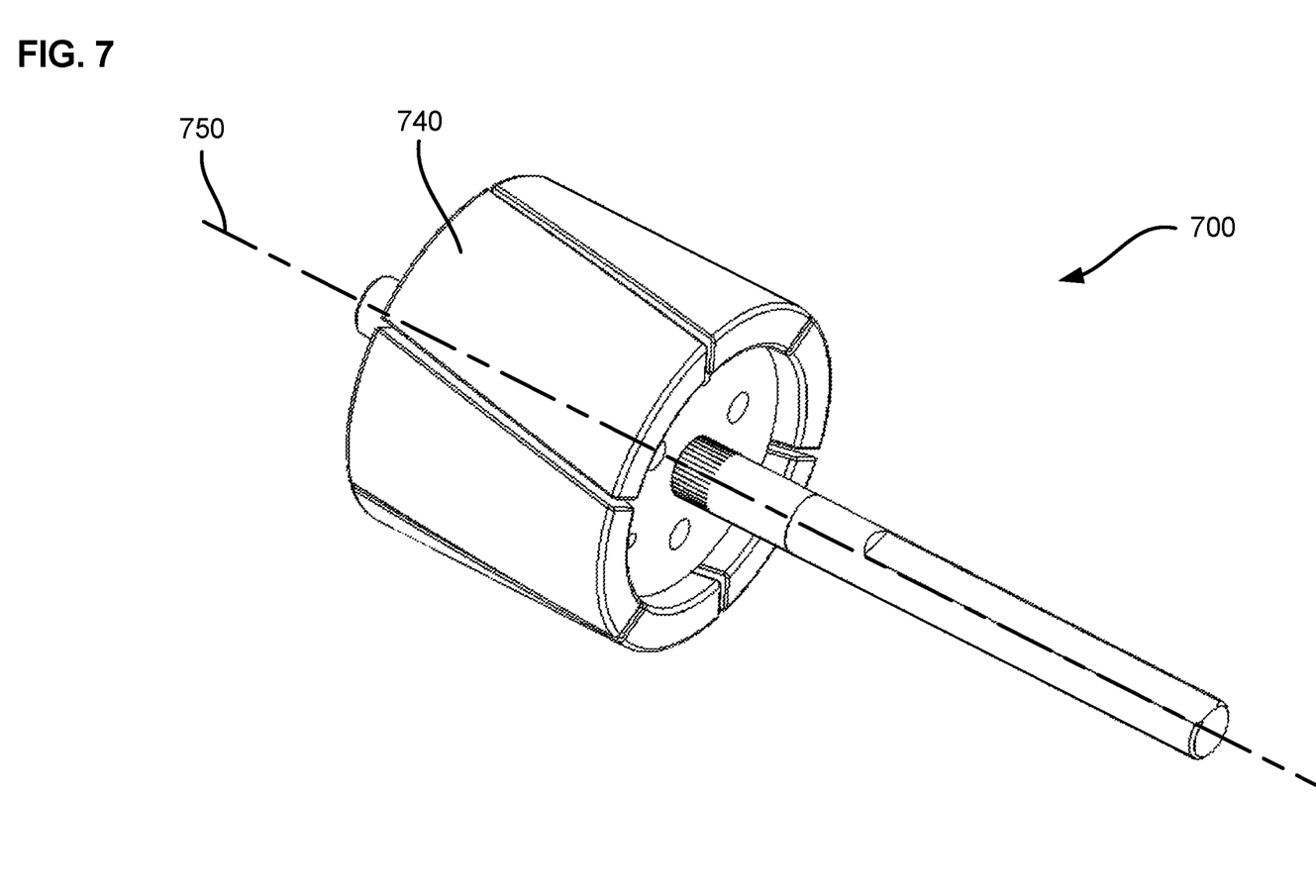
FIG. 7 another example single phase, direct current permanent magnet brushless electric rotor with the magnets skewed.

Finally, torque plot 540 illustrates cogging torque for an electronic motor with a biasing feature as described herein, with magnets 740 of the rotor being skewed axially (i.e., from an axis 750) by 10 degrees, as illustrated by the example electric motor 700 shown in FIG. 7. The torque plot 540 shown in FIG. 5 exhibits peak cogging torque of approximately less than 10 ounce-inches, or approximately one-sixth that of the electric motor with locating features.

Figure 6:
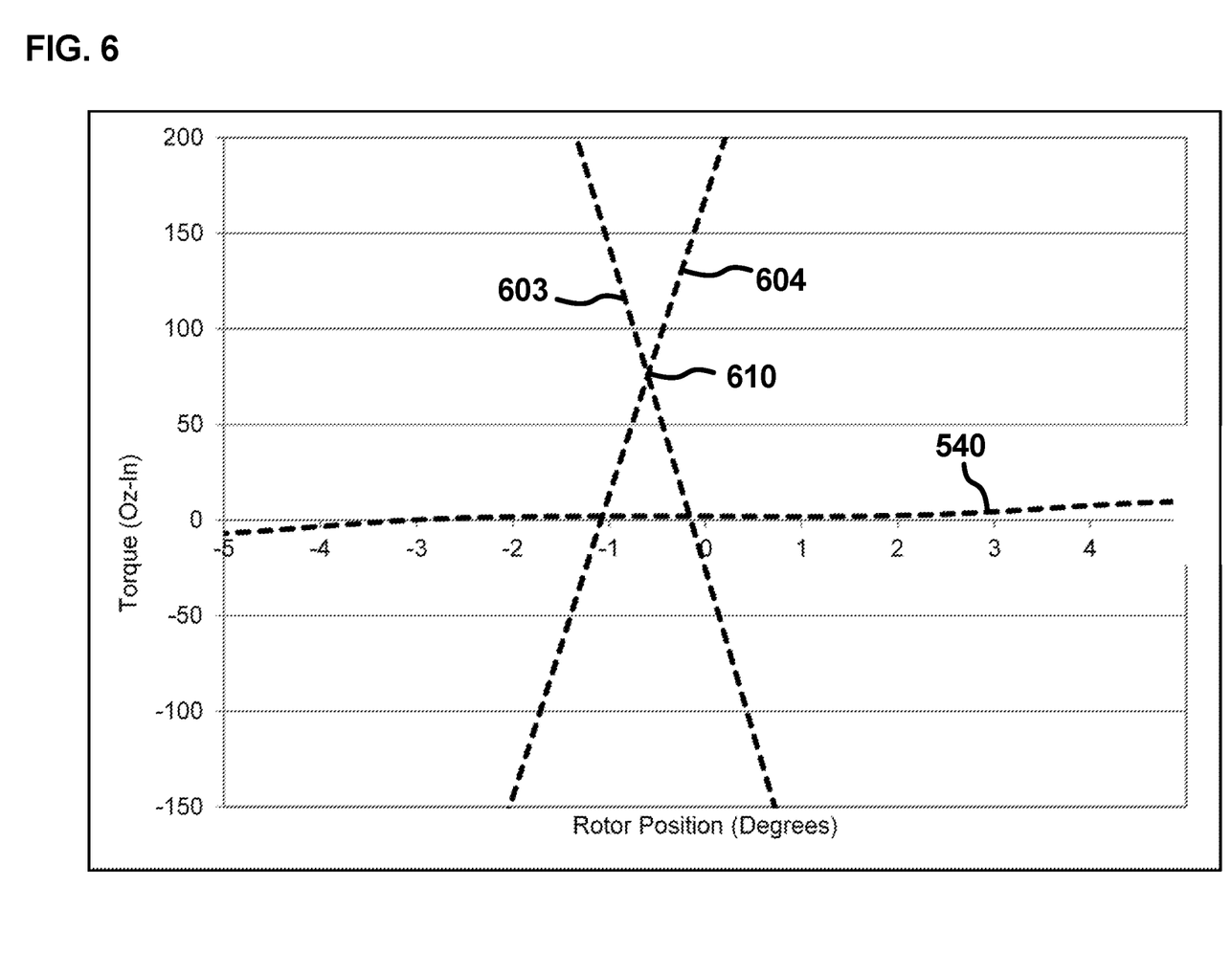
FIG. 6 shows an example simulated plot of minimum crossover or starting torque for one of the single phase, direct current permanent magnet brushless electric motors.

FIG. 6 illustrates the simulated crossover or minimum torque that is available by the biasing feature coupled with a permanent magnet rotor that is skewed by 10 degrees, as illustrated by the motor 700 of FIG. 7. As the current is applied through the windings 112 in forward direction 603 and reverse direction 604, the motor 700 provides a minimum torque 610 of approximately 80 ounce-inches.

Figure 8:
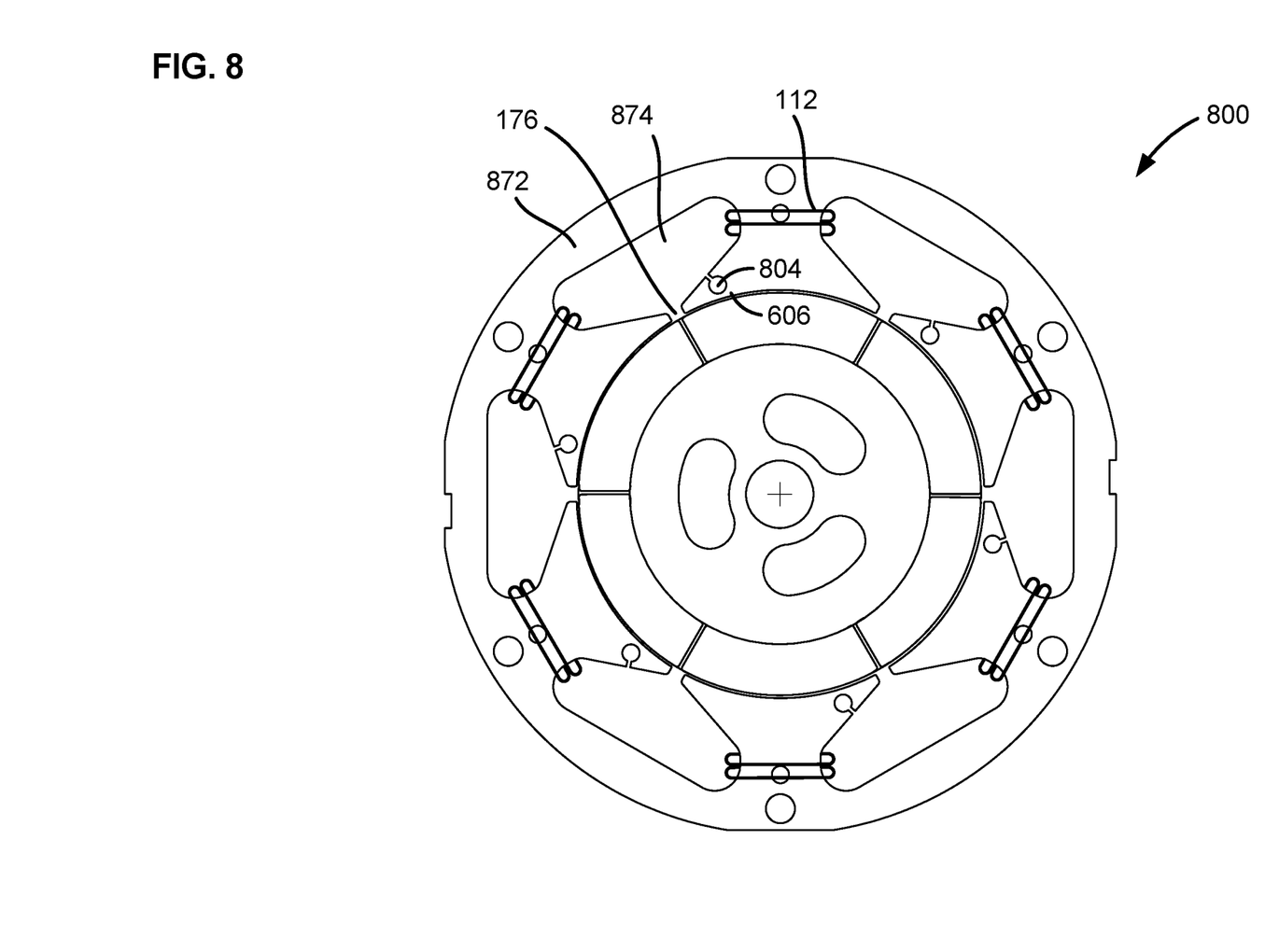
FIG. 8 shows a schematic view of a portion of another example single phase, direct current permanent magnet brushless electric motor.
Figure 9:
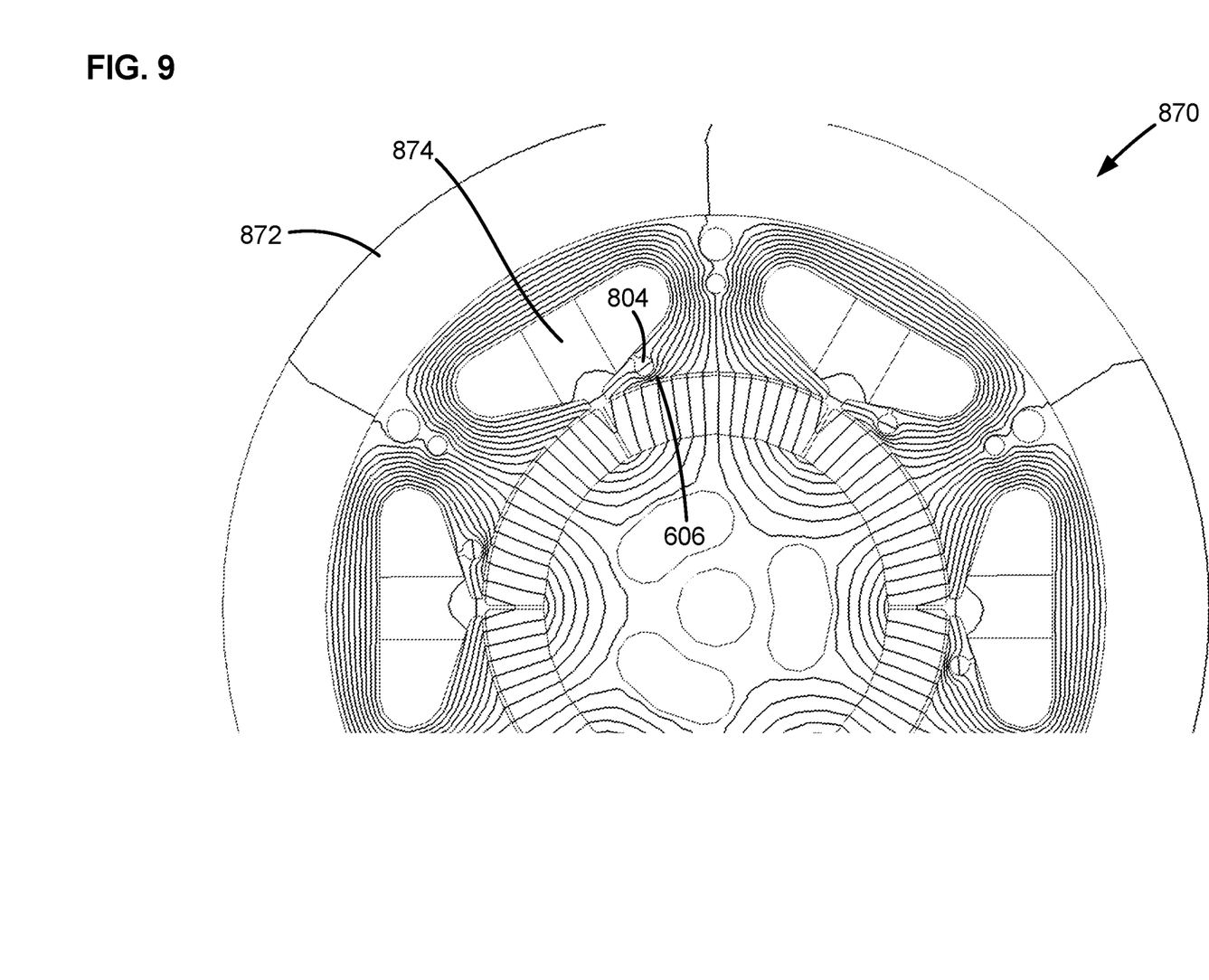
FIG. 9 shows a simulated finite element plot of a portion of the electric motor of FIG. 8.

Referring now to FIGS. 8-9, another example electric motor 800 is shown. This electric motor 800 is similar to that of the electric motor 100 described above. However, the electric motor 800 includes a biasing feature 804 formed as an opening (or keyhole) within each winding slot 874 through which the wires 112 are wound.

As shown in a simulated finite element plot 870 of FIG. 8 of the motor 800, the biasing feature 804 causes the magnetic flux caused by the current running through the poles 110 to saturate at a portion 606 adjacent to the biasing feature 804. This shifts the magnetic alignment of the poles slightly to offset from the axis 202. This increases the available torque to the electric motor.

In addition, as noted, since the biasing feature 804 is located within the lamination of the stator 872, the interior surface 204 of the stator 872 remains smooth and unbroken by any locating features or non-uniform airgap, except for openings 176 used to wind. In other words, the interior surface 204 of the stator 872 lacks any locating features formed therein. This reduces the cogging and vibration associated with low rotational speeds of the rotor 160 caused by locating features.

Figure 10:
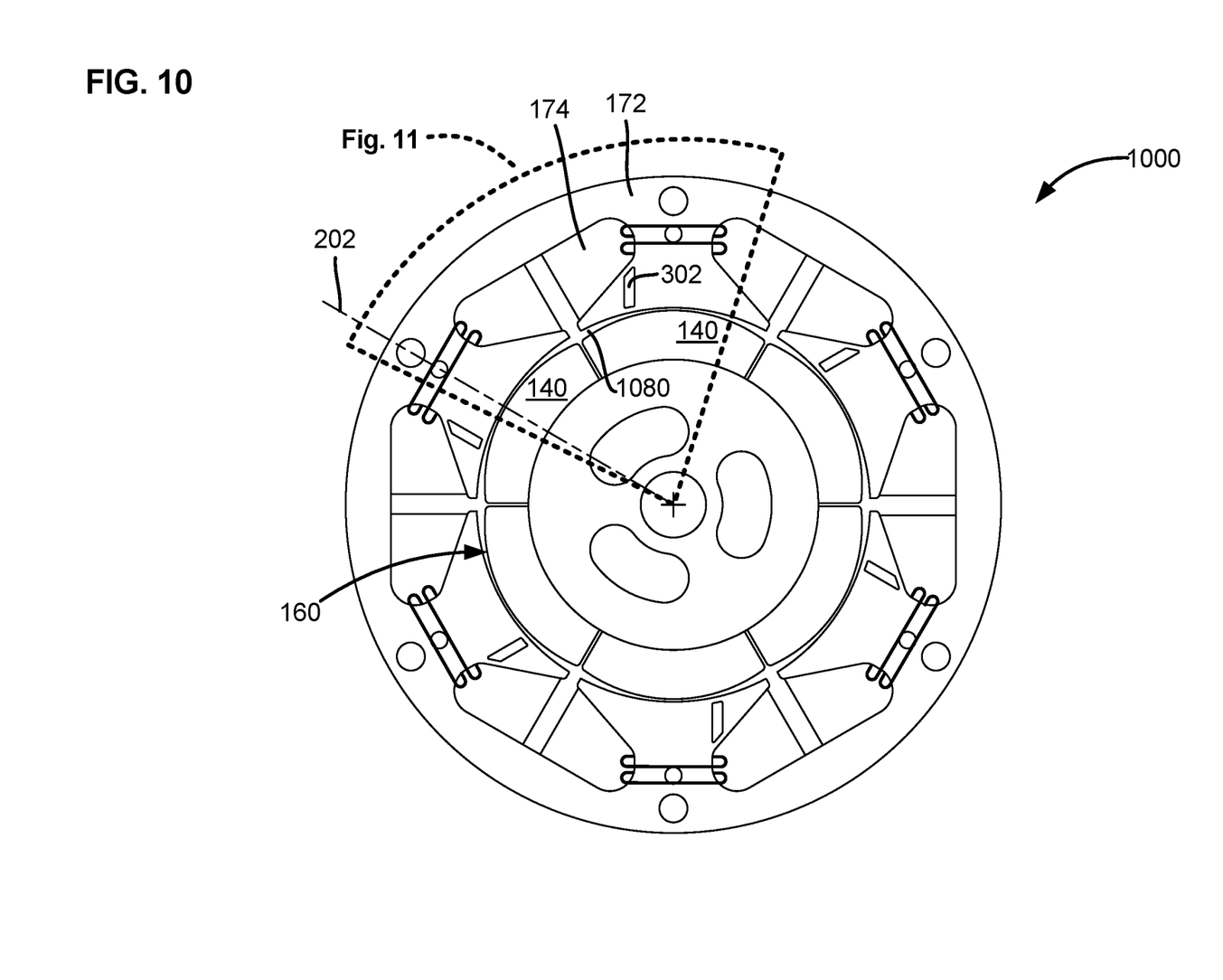
FIG. 10 shows a schematic view of a portion of another example single phase, direct current permanent magnet brushless electric motor.
Figure 11:
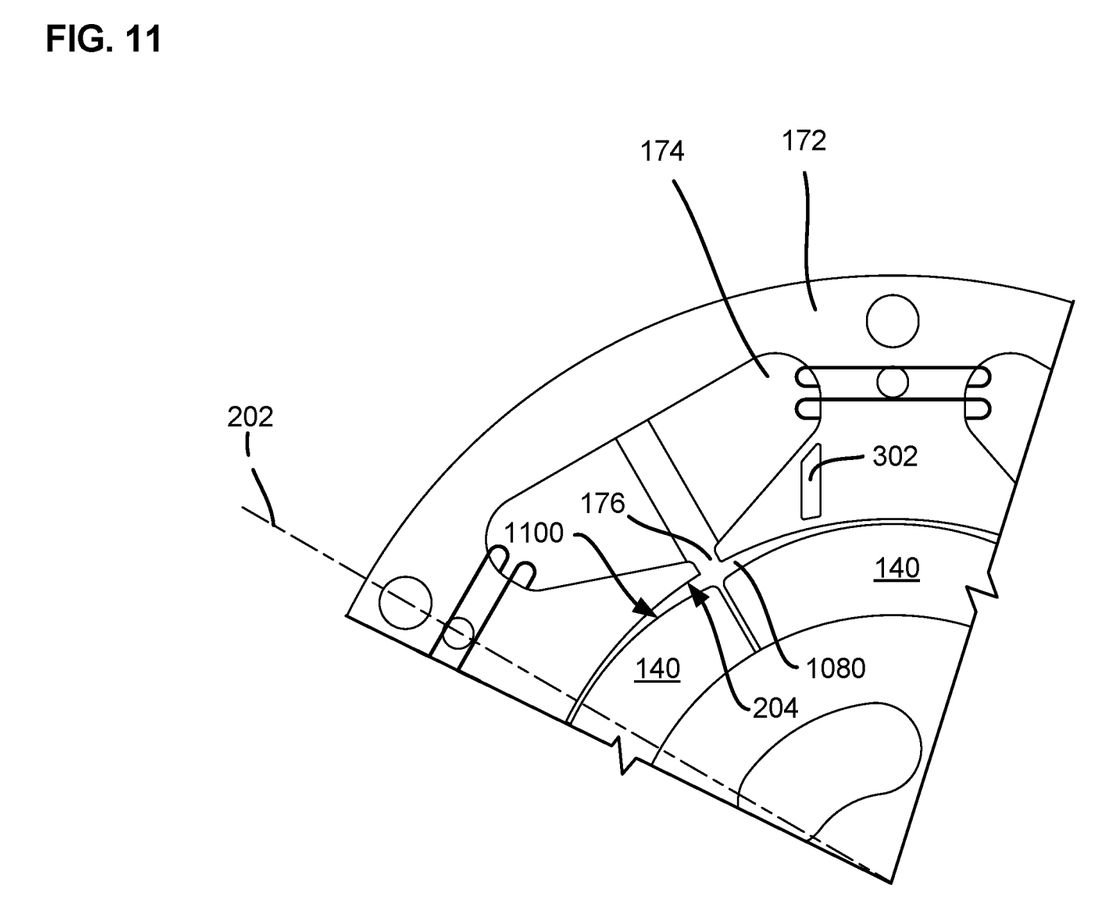
FIG. 11 shows an enlarged view of a portion of the electric motor of FIG. 10.

Referring now to FIGS. 10-11, a schematic view of another electric motor 1000 is shown. In this embodiment, the motor 1000 includes a balanced, non-concentric airgap 1080, formed between the stator 170 and the rotor 160. In other words, the inner diameter 204 of the stator 170 is concentrically uniform (except for openings 176 used to wind), but the magnets forming the poles 140 of the rotor 160 are non-uniform. In other words, in this embodiment, the magnets forming the poles 140 have an external surface 1100 that is non-concentric with the inner diameter 204 of the stator 170.

However, the balanced, non-concentric airgap does not function as a locating feature because the airgap does not shift the location of the rotor relative to the axis 202. This non-concentric airgap 1080, along with the opening 302 in each lamination 172, reduces the cogging and vibration associated with low rotational speeds of the rotor 160.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A single phase, permanent magnet electric motor, comprising:
   a rotor with a plurality of alternate polarity permanent magnets each defining a permanent magnet central axis in a plane perpendicular to a rotation axis of the motor and extending radially through the rotation axis; and
   a stator including teeth forming a like number of poles, each of the teeth defining a tooth central axis in the plane and extending radially through the rotation axis;
   wherein the stator forms one or more openings concentrating magnetic flux at at least one location, the one or more openings being positioned to bias the permanent magnet central axes away from alignment with the tooth central axes when there is electrical current in the poles of the stator and the rotor is at rest,
   wherein the stator has an interior surface unbroken by locating features, and wherein the stator defines the one or more openings.

2. The motor of claim 1, wherein the one or more openings are formed independently from winding slots of the stator through which windings are wound.

3. The motor of claim 1, wherein the one or more openings are formed as part of winding slots of the stator through which windings are wound.

4. The motor of claim 3, wherein the one or more openings are keyholes.

5. The motor of claim 1, wherein the one or more openings include a non-uniform winding slot formed in a lamination of the stator.

6. The motor of claim 1, wherein the alternate polarity permanent magnets are axially skewed.

7. The motor of claim 1, wherein an airgap between the rotor and the stator is balanced and non-concentric.

8. A single phase, permanent magnet electric motor, comprising:
   a rotor with a plurality of alternate polarity permanent magnets each defining a permanent magnet central axis in a plane perpendicular to a rotation axis of the motor and extending radially through the rotation axis; and
   a stator including teeth forming a like number of poles, each of the teeth defining a tooth central axis in the plane and extending radially through the rotation axis;
   wherein the stator has an interior surface unbroken by locating features;
   wherein the stator forms one or more openings positioned to shift the poles such that the permanent magnet central axes are offset from alignment with the tooth central axes when there is electrical current in the poles of the stator and the rotor is at rest.

9. The motor of claim 8, wherein the one or more openings are formed as part of winding slots of the stator through which windings are wound.

10. The motor of claim 8, wherein the one or more openings are keyholes.

11. The motor of claim 8, wherein the one or more openings include a non-uniform winding slot formed in a lamination of the stator, and wherein the alternate polarity permanent magnets are axially skewed.

12. The motor of claim 8, wherein an airgap between the rotor and the stator is balanced and non-concentric.

13. A method of forming a single phase, permanent magnet electric motor, the method comprising:
   positioning a rotor with a plurality of alternate polarity permanent magnets each defining a permanent magnet central axis in a plane perpendicular to a rotation axis of the motor and extending radially through the rotation axis within a stator including teeth forming a like number of poles, each of the teeth defining a tooth central axis in the plane and extending radially through the rotation axis, wherein the stator has an interior surface unbroken by locating features; and
   forming one or more biasing features positioned in the stator to shift the poles to increase a minimum starting torque of the electric motor and such that the permanent magnet central axes are offset from alignment with the tooth central axes when there is electrical current in the poles of the stator and the rotor is at rest.

14. The method of claim 13, further comprising defining one or more openings in the stator that form the one or more biasing features.

15. The method of claim 14, further comprising forming the one or more openings independently from winding slots of the stator through which windings are wound.

16. The method of claim 14, further comprising forming the one or more openings as part of winding slots of the stator through which windings are wound.

17. The method of claim 16, further comprising forming the one or more openings as keyholes.

18. The method of claim 13, further comprising:
   forming the one or more biasing features as non-uniform winding slots in a lamination of the stator; and
   axially skewing the alternate polarity permanent magnets.

19. The method of claim 13, further comprising forming an airgap between the rotor and the stator that is balanced and non-concentric.

* * * * *